United States Patent
Dawson, Jr.

[11] 3,872,292
[45] Mar. 18, 1975

[54] SONIC MEANS FOR DETECTING COMPRESSOR STALL

[75] Inventor: William H. Dawson, Jr., Waldwick, N.J.

[73] Assignee: The United States of America as represented by the Secretary of the Navy, Washington, D.C.

[22] Filed: July 26, 1973

[21] Appl. No.: 382,806

[52] U.S. Cl. ............... 235/151.3, 73/116, 73/117.3, 235/150.2, 340/27 SS
[51] Int. Cl. ............................................ G06g 7/70
[58] Field of Search .................... 235/150.2, 151.3; 340/27 SS; 73/116, 117.1, 117.2, 117.3, 69; 137/15.2; 60/239, 368

[56] References Cited
UNITED STATES PATENTS

| | | | |
|---|---|---|---|
| 3,238,768 | 3/1966 | Richardson | 73/117.3 |
| 3,426,322 | 2/1969 | Balo | 73/116 X |
| 3,518,621 | 6/1970 | Collett et al. | 340/27 SS |
| 3,523,423 | 8/1970 | Young | 60/239 X |
| 3,697,731 | 10/1972 | Kempema et al. | 235/150.2 |
| 3,731,070 | 5/1973 | Urban | 73/116 X |

Primary Examiner—Malcolm A. Morrison
Assistant Examiner—Jerry Smith
Attorney, Agent, or Firm—R. S. Sciascia; Henry Hansen

[57] ABSTRACT

A system for providing a warning signal when certain sensed turbine engine operating conditions, specifically certain measured noise levels, indicate a compressor stall is about to occur. A sensing system includes two microphones placed at separate locations on the engine and a tachometer. A computer includes two function generating units, the first unit providing a measured sonic parameter from the microphone signals and the second unit producing a computed sonic parameter from stored empirical engine data as a function of the engine rotational speed. The two sonic parameters thus obtained are fed into a comparator, which provides a stall warning signal when the two signals are equal, indicating incipient compressor stall.

14 Claims, 2 Drawing Figures

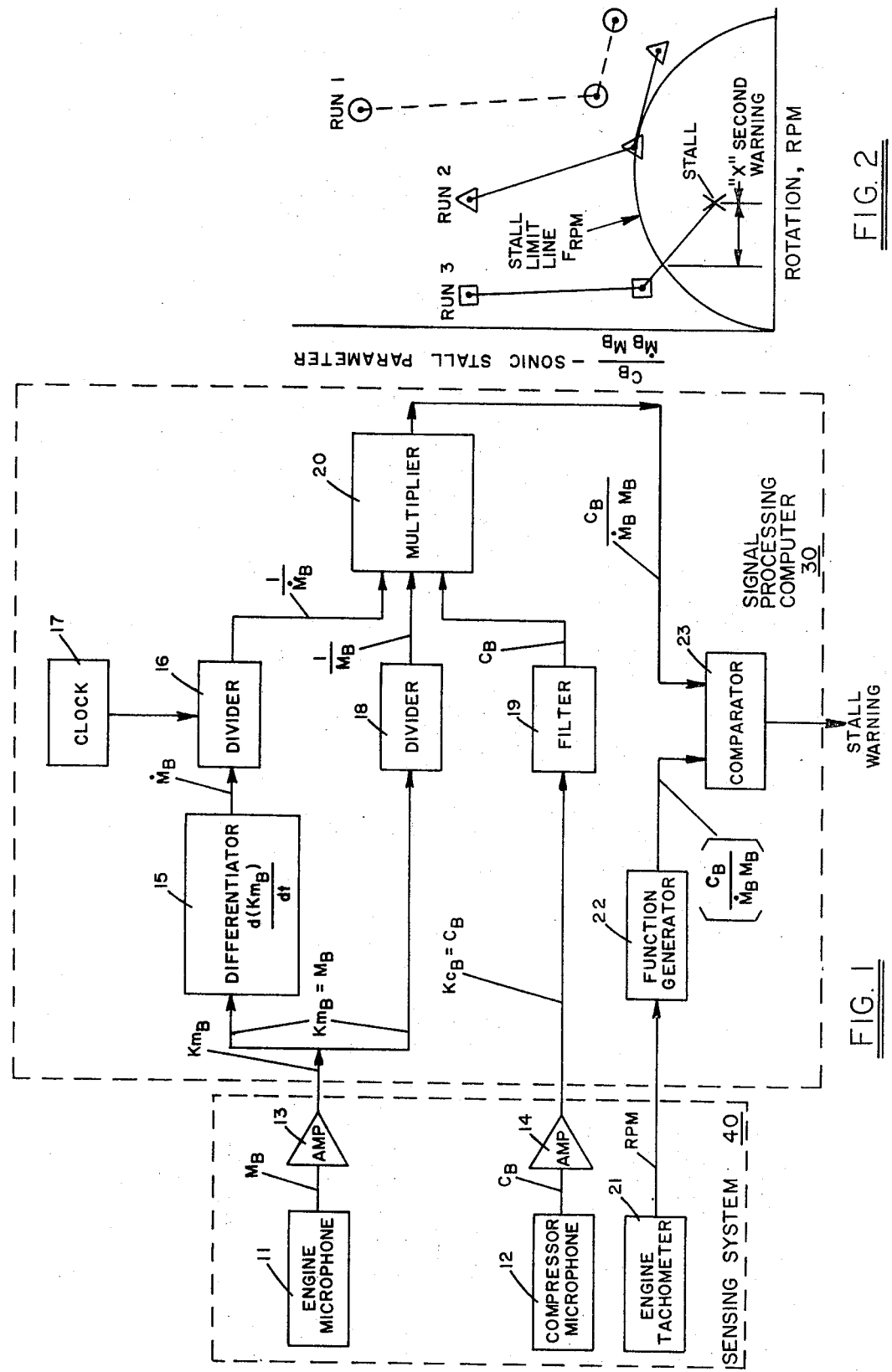

SONIC MEANS FOR DETECTING COMPRESSOR STALL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of measuring and testing and more particularly to a system for the sonic detection of a turbine engine compressor stall condition.

In rotating turbine machinery compressor stall can lead to turbine shutdown with catastrophic consequences. A critical problem is the ability to predict incipient compressor stall so that prior thereto the fuel supply can be adjusted to prevent turbine shutdown. Among the techniques employed to solve this problem are visual means, such as trachometers or lights, or vibration sensing means which depend upon the amplitude of signals generated by the machinery. Although a tachometer provides the most positive indication of incipient compressor stall, it is not sufficiently responsive, for by the time engine rpm can be visibly seen to decrease, stall has already begun and it is generally too late to react and prevent turbine shutdown. A combination of lights operating from meters have the same inherent shortcoming. These types of warning devices lack the ability to expeditiously detect the subtle prognosticating signs of incipient compressor stall. Compressor sonic amplitude is not in itself necessarily indicative of compressor operating condition. Variations in engine mechanical tolerances from different manufacturers produce widely differing sonic amplitudes. These amplitudes are reduced considerably with extended engine life, but large peak to means amplitudes can result from localized metal fatigue producing metal spurs, causing confusion as to the meaning of intermittent high amplitude sonic signals.

SUMMARY OF THE INVENTION

Accordingly, it is a general purpose and object of the present invention to provide an improved, accurate, simple, portable and responsive sonic advance warning system of incipient compressor stall by comparing a measured parameter with a computed parameter based upon empirically obtained engine sonic data. It is a further object of the present invention to detect impending compressor stall by computerized signal processing techniques.

These and other objects are accomplished according to the present invention by a signal processing system including an engine and a compressor microphone generating sonic signals and an engine tachometer. A time derivataive of the engine noise signal is obtained in a differentiator and the resultant signal is inverted in a first divider receiving a clock pulse. The original engine noise signal is inverted in a second divider. The compressor noise signal is fed through a wideband filter, and the three outputs are introduced into a multiplier where the product, constituting a measured sonic parameter, is obtained. This product is one input to a comparator, the other input being a computed sonic parameter signal from stored empirical engine data as a function of the engine rotational speed. When the measured sonic parameter equals the computed sonic parameter, a stall warning signal is given.

BRIEF DESCRIPTION OF THE DRAWINGS

FIG. 1 is a block diagram of a system for anaylzing and comparing sonic spectra to detect compressor stall in a turbine engine; and FIG. 2 is a graphical representation of a sonic stall parameter versus rotational speed depicting a typical stall limit line.

DESCRIPTION OF THE PREFERRED EMBODIMENT

Referring to FIG. 1 a pair of microphones 11 and 12, preferably of a condenser type, are placed respectively at the midpoint and the inlet of a turbine engine compressor section (not shown). The sonic signal $m_B$ from microphone 11 is fed into an amplifier 13 yielding an amplified output signal $Km_B$, and the sonic output signal $c_B$ from microphone 12 is similarly fed into an amplifier 14 yielding an amplified output signal $Kc_B$. Signals $Km_B$ and $Kc_B$, as well as an engine RPM signal from a tachometer-generator 21 which, along with microphones 11 and 12, comprise a sensing system 40, are introduced into a signal processing computer 30, such as Electronic Associates TR20 general purpose analog computer. Engine RPM could also be obtained from the microphone signals thus making the stall warning system totally portable. A narrow-band filter and tracking device would be required to accomplish a continuous lock on a selected revolving engine component, such as a gear or pump, which produce a strong and consistent sonic discrete signal for all engine operating configurations. Signal $Km_B$ is thereupon split. One portion is fed into a differentiator 15 whose time derivative output signal $\dot{M}_B$ is fed into a divider 16 connected to a clock 17 for timing the operation of divider 16, where it is inverted yielding a reciprocal output signal $1/\dot{M}_B$. The other portion $m_B$ is fed into a divider 18 where it is inverted yielding an output signal $1/M_B$. Signal $Kc_B$ is fed into a wideband filter 19 allowing only selected compressor frequencies $C_B$ to pass. The three measured signals, $1/\dot{M}_B$, $1/M_B$ and $C_B$ thus derived are fed into a multiplier 20 yielding the product or sonic parameter signal $C_B/\dot{M}_B M_B$. It has been empirically determined that this parameter affords the best advance indication of impending compressor stall.

The RPM output of tachometer 21 is continuously fed into a function generator 22 portion of computer 30, which contains stored empirical turbine and compressor sonic data obtained from a specific engine configuration similar to the configuration presently being used. Referring to FIG. 2, a stall limit line, $F_{RPM}$, is computed for a particular engine exhaust configuration in function generator 22. For illustrative purposes only, the data shown in FIG. 2 is indicative of a Pratt-Whitney model J65-W-16A turbojet engine with an exhaust jet area of 330 square inches. Each stall limit for a particular exhaust jet area is calculated from empirical data obtained from many engine runs during which numerous parameters including engine and compressor sonic information has been recorded for varying fuel flow and exhaust jet area conditions. Based upon the empirical sonic data obtained during steady state and stall acceleration conditions, function generator 22 computes a predicted sonic stall parameter, $[C_B/\dot{M}$ $_BM_B$], at the measured engine RPM from tachometer 21 in FIG. 1. This is the predicted stall limit line value for predicting compressor stall at a particular RPM. In order to provide a general alignment reference for the test data at all conditions, a minimum limit of 1.63 is fixed for the sonic parameter term $\dot{M}_B$. Thus aligned, none of the runs in which compressor stall did not occur penetrated stall limit line $F_{RPM}$, whereas all of the runs in which stall occurred did penetrate stall limit line $F_{RPM}$.

FIG. 2 shows three typical engine runs. Run 1 is typical of a "no stall" acceleration run in which stall limit line, $F_{RPM}$, is not penetrated, and thus no stall warning is given. In Run 2 the curve touches $F_{RPM}$ but does not penetrate the region beneath. Stall does not occur under this condition. In Run 3 the acceleration curve penetrates $F_{RPM}$ ending in a conventional $P_3$ stall (i.e., at the compressor outlet). The elapsed time between penetration of $F_{RPM}$ and actual stall is the warning period during which time fuel flow can be reduced or tailpipe nozzle area increased to compensate and avoid stall. The sonic stall warning times vary generally from about 0.2 second to as much as 1.0 second.

Referring now to FIG. 1 the measured sonic parameter, $C_B/\dot{M}_BM_B$, from multiplier 20 and the computed sonic parameterr, $[C_B/\dot{M}_BM_B]$, from function generator 22 are both fed into a comparator 23 within computer 30, which continuously compares the two signals for detection of impending compressor stall. Comparator 23 is set at a limit slightly below the computed value of $[C_B/\dot{M}_BM_B]$, such as 1% or 2%, so that a condition such as Run 2 in FIG. 2 will not give a stall indication. When the value of measured sonic parameter, $C_B/\dot{M}_BM_B$, equals or is less than the set value of computed sonic parameter, $[C_B/\dot{M}_BM_B]$, a stall warning is indicated, such as by a thyratron-type actuating device. Upon stall warning indication, a signal is conveyed to a fuel supply control means (not shown) in order to automatically reduce fuel flow and prevent the impending stall. If the measured value is greater than the set value, operating conditions are normal and no stall warning is indicated.

Some of the many advantages of the present invention should now be readily apparent. The warning system described herein is capable of detecting incipient compressor stall up to one second before actual stall and transmitting a signal to a compensating system to prevent stall. The warning system is simple, requiring a minimum of components and is completely portable. Accuracy for any configuration turbine engine is achieved by obtaining empirical sonic test data under varying conditions.

Obviously many modifications and variations of the present invention are possible in light of the above teachings. It is therefore to be understood that within the scope of the appended claims the invention may be practiced otherwise than as specifically described.

What is claimed is:

1. A condition detection system for rotating machinery comprising:
   first and second sonic detectors located at discrete and separate locations on the machinery for generating respective first and second signals;
   a speed detector for generating a third signal indicative of the rotational speed of the machinery; and
   computer means connected to receive said first, second and third signals for producing an output signal indicative of the condition.

2. A system according to claim 1 wherein said computer means further comprises:
   first function generator means receiving said first and second signals for producing a fourth signal indicative of an actual machinery operating condition;
   second function generator means receiving said third signal for producing a fifth signal as a function of said third signal and indicative of a predetermined limit of the machinery condition; and
   comparator means receiving said fourth and fifth signals for producing an output signal indicative of the difference therebetween.

3. A system according to claim 2 wherein said first function generator means further comprises:
   a differentiator connected to receive said first signal for producing an output signal indicative of the rate of change thereof;
   divider means connected to receive said first signal and said differentiator output signal for producing output signals indicative of the respective reciprocals of the received signals;
   a filter connected to receive said second signal for producing an output signal indicative of discrete frequencies thereof; and
   a multiplier connected to receive said divider means output signals and said filter output signal for producing said fourth signal.

4. A system according to claim 3 wherein said fifth signal is generated from empirical data indicative of the condition limit and corresponds with said fourth signal.

5. A system for detecting impending compressor stall in a turbine engine comprising:
   first and second sonic detectors located at discrete and separate locations on the engine for generating respective first and second signals;
   a speed detector for generating a third signal indicative of the engine rotational speed; and
   computer means connected to receive said first, second and third signals for producing an output signal indicative of impending compressor stall.

6. A system according to claim 5 wherein said first sonic detector is juxtapositioned from a mid-compressor stage.

7. A system according to claim 6 wherein said second sonic detector is juxtapositioned from a first compressor stage.

8. A system according to claim 7 wherein said computer means further comprises:
   first function generator means receiving said first and second signals for producing a fourth signal indicative of an actual turbine engine operating condition;
   second function generator means receiving said third signal for producing a fifth signal indicative of a predetermined limit of impending compressor stall as a function of said third signal;
   comparator means receiving said fourth and fifth signals for producing an output signal indicative of the difference therebetween.

9. A system according to claim 8 wherein said first function generator means further comprises:
   a differentiator connected to receive said first signal for producing an output signal indicative of the rate of change thereof;
   divider means connected to receive said first signal and said differentiator output signal for producing output signals indicative of the respective reciprocals of the received signals;
a filter connected to receive said second signal for producing an output signal indicative of discrete frequencies thereof; and
a multiplier connected to receive said divider means output signals and said filter output signal for producing said fourth signal.

10. A system according to claim 8 wherein said fifth signal is generated from empirical data indicative of a compressor stall limit and corresponds with said fourth signal.

11. A computer for detecting a rotating machinery condition comprising: first function generator means for receiving first and second sonic signals and producing an output signal indicative of an actual machinery operating condition;
second function generator means for receiving a signal indicative of the rotational speed of the machinery and producing an output signal as a function of the received signal and indicative of a predetermined limit of the machinery condition; and
comparator means receiving said first and said second function generator means output signals for producing an output signal indicative of the difference therebetween.

12. A computer according to claim 11 wherein said first function generator means further comprises:
a differentiator receiving the first sonic signal for producing an output signal indicative of the rate of change thereof;
divider means connected to receive the first sonic signal and said differentiator output signal for producing output signals indicative of the respective reciprocals of the received signals;
a filter connected to receive the second sonic signal for producing an output signal indicative of discrete frequencies thereof; and
a multiplier connected to receive said divider means output signals and said filter output signal for producing said first function generator means output signal.

13. A computer according to claim 12 wherein said second function generator means output signal is generated from empirical data indicative of the condition limit and corresponds with said first function generator means output signal.

14. A condition detection system for rotating machinery comprising:
first and second sonic detectors located at discrete and separate locations on the machinery for respectively generating a first signal $M_B$ and a second signal $C_B$;
a speed detector for generating a third signal indicative of the rotational speed of the machinery; and
computer means including first function generator means connected to receive said first and second signals for producing an output signal according to the formula, $$C_B/\dot{M}_B M_B$$

where:
$C_B$ = Compressor broadband sonic signal
$M_B$ = Turbine engine broadband sonic signal
$\dot{M}_B$ = Rate of change of $M_B$, second function generator means connected to receive said third signal for producing an output signal as a function of said third signal generated from empirical data according to the formula, $C_B/\dot{M}_B M_B$, and comparator means receiving said respective first and second function generator means output signals for producing an output signal indicative of the difference therebetween.

* * * * *